(12) United States Patent
Packer et al.

(10) Patent No.: US 7,444,403 B1
(45) Date of Patent: Oct. 28, 2008

(54) DETECTING SEXUALLY PREDATORY CONTENT IN AN ELECTRONIC COMMUNICATION

(75) Inventors: Alan Packer, Redmond, WA (US); Paul Stephen Rehfuss, Seattle, WA (US); James H. Alexander, Highlands Ranch, CO (US)

(73) Assignee: Microsoft Corporation, Redmond, WA (US)

( * ) Notice: Subject to any disclaimer, the term of this patent is extended or adjusted under 35 U.S.C. 154(b) by 1147 days.

(21) Appl. No.: 10/721,977

(22) Filed: Nov. 25, 2003

(51) Int. Cl.
*G06F 15/16* (2006.01)
*G06F 15/173* (2006.01)
*G06F 15/177* (2006.01)

(52) U.S. Cl. .................... 709/224; 709/238; 707/3; 704/9

(58) Field of Classification Search ......... 709/217–228, 709/238; 707/3; 704/9
See application file for complete search history.

(56) References Cited

U.S. PATENT DOCUMENTS

| | | | |
|---|---|---|---|
| 4,991,094 A | 2/1991 | Fagan et al. |
| 5,706,507 A | 1/1998 | Schloss |
| 5,717,913 A | 2/1998 | Driscoll |
| 5,724,567 A | 3/1998 | Rose et al. |
| 5,848,186 A | 12/1998 | Wang et al. |
| 5,875,446 A | 2/1999 | Brown et al. |
| 5,911,043 A | 6/1999 | Duffy et al. |
| 5,940,821 A | 8/1999 | Wical |
| 6,178,419 B1 | 1/2001 | Legh-Smith et al. |
| 6,233,575 B1 | 5/2001 | Agrawal et al. |
| 6,233,618 B1 | 5/2001 | Shannon |
| 6,266,664 B1 | 7/2001 | Russell-Falla et al. |
| 6,334,131 B2 | 12/2001 | Chakrabarti et al. |
| 6,389,436 B1 | 5/2002 | Chakrabarti et al. |
| 6,418,433 B1 | 7/2002 | Chakrabarti et al. |
| 6,453,327 B1 | 9/2002 | Nielsen |
| 6,606,659 B1 * | 8/2003 | Hegli et al. ............... 709/225 |

(Continued)

FOREIGN PATENT DOCUMENTS

DE    10024733 A1    11/2001

(Continued)

OTHER PUBLICATIONS

Resnick, et al., *PICS: Internet Access Controls Without Censorship*, Communications of the Association for Computing Machinery, Oct. 1996, pp. 87-93, vol. 39, No. 10, Communications of the Association for Computing Machinery, New York.

(Continued)

*Primary Examiner*—Haresh N Patel
(74) *Attorney, Agent, or Firm*—Senniger Powers LLP

(57) ABSTRACT

A system and method for detecting an electronic communication such as an email, an instant messaging session, or a chat session that relates to an unsafe behavior directed to or engaged by a user. Instructions are adapted to analyze one or more features of the electronic communication, which is sent or received by the user. Instructions are adapted to categorize the electronic communication as relating to the unsafe behavior based on the analyzed features. A report is generated if the electronic communication is categorized as relating to the unsafe behavior. Instructions are adapted to send the report to a responsible person such as a parent, guardian, or other responsible person of the user. The report informs the responsible person that the electronic communication possibly relates to the unsafe behavior.

32 Claims, 6 Drawing Sheets

U.S. PATENT DOCUMENTS

| | | | |
|---|---|---|---|
| 6,684,254 | B1 | 1/2004 | Dutta |
| 6,701,350 | B1 | 3/2004 | Mitchell |
| 6,745,367 | B1 | 6/2004 | Bates et al. |
| 6,772,214 | B1 | 8/2004 | McClain et al. |
| 6,854,074 | B2 | 2/2005 | McLellan et al. |
| 6,925,433 | B2 * | 8/2005 | Stensmo ................. 704/9 |
| 6,976,070 | B1 | 12/2005 | Hoashi et al. |
| 7,194,464 | B2 | 3/2007 | Kester et al. |
| 2002/0059221 | A1 | 5/2002 | Whitehead et al. |
| 2002/0087403 | A1 | 7/2002 | Meyers et al. |
| 2002/0107853 | A1 | 8/2002 | Hofmann et al. |
| 2002/0116641 | A1 | 8/2002 | Mastrianni |
| 2002/0120754 | A1 | 8/2002 | Anderson et al. |
| 2003/0093518 | A1 | 5/2003 | Hiraga |
| 2003/0163731 | A1 | 8/2003 | Wigley et al. |
| 2003/0195872 | A1 | 10/2003 | Senn |
| 2004/0015586 | A1 * | 1/2004 | Hegli et al. ............ 709/225 |
| 2005/0022008 | A1 | 1/2005 | Goodman et al. |
| 2005/0050222 | A1 * | 3/2005 | Packer .................. 709/238 |
| 2007/0156656 | A1 * | 7/2007 | Pather et al. ............. 707/3 |

FOREIGN PATENT DOCUMENTS

| | | |
|---|---|---|
| EP | 1076299 A2 | 2/2001 |
| WO | WO 00/68833 A2 | 11/2000 |
| WO | WO 01/90932 A2 | 11/2001 |

OTHER PUBLICATIONS

"Look Ahead Filtering of Internet Content," IBM Technical Disclosure Bulletin, vol. 40, No. 12, Dec. 1, 1997, pp. 143, New York, U.S.A.

Qiu et al., "Using Link Types in Web Page Ranking and Filtering," Web Information Systems Engineering, 2001, Proceedings of the Second International Conference, vol. 1, Dec. 3, 2001, pp. 311-320.

Soumen et al., "Enhanced Hypertext Categorization Using Hyperlinks," Sigmod Record, Jun. 1998, vol. 27, No. 2, pp. 307-318, Croatian Soc. Chem. Eng., Croatia.

Oh et al., A Practical Hypertext Categorization Method Using Links and Incrementally Available Class Information, Jul. 24, 2000, vol. 34, pp. 264-271, U.S.A.

Jacob, V., et al., "Filtering Objectionable Internet Content," International Conference on Information Systems, Proceeding of the 20th International Conference on Information Systems, Dec. 1999, pp. 274-278.

Dumais, S., et al., "Hierarchical Classification of Web Content," Annual ACM Conference on Research and Development in Information Retrieval, Proceedings of the 23rd Annual International ACM SIGIR Conference on Research and Development in Information Retrieval, Jul. 2000, pp. 256-263.

* cited by examiner

DETECTING SEXUALLY PREDATORY CONTENT IN AN ELECTRONIC COMMUNICATION

TECHNICAL FIELD

Embodiments of the present invention relate to the field of detecting an electronic communication relating to an unsafe or undesired behavior. In particular, embodiments of the present invention relate to analyzing one or more features of an electronic communication and categorizing the electronic communication as relating to an unsafe or undesired behavior based on the analyzed features.

BACKGROUND OF THE INVENTION

As personal computers become widespread among households, the Internet (or the World Wide Web) has become a powerful household tool as well. Each day, millions of people use the Internet to shop, to research, to receive education, etc. The Internet has also become a forum for adults and minors alike to meet people. Through emails, chat rooms, and instant messaging, people all over the world use this new means of communication to meet new friends, to converse with friends and relatives, and to explore a wide range of social functions.

Even though electronic communication through the Internet has become a convenient social tool, nonetheless it is potentially very dangerous for users of the Internet, especially for minors. An estimated 70 million minors under the age of 18 use the Internet. Minors use the Internet extensively to communicate with friends and increasingly with classmates and teachers to perform school assignments. However, Internet usage by minors also opens the door for minors to receive an electronic communication relating to an unsafe or undesired behavior. The Internet may provide a false sense of privacy and security. Minors are likely to trust unsafe or predatory individuals on the Internet and thus become targets of a criminal or abusive behavior. Additionally, parents usually have little or no knowledge of minors' communication on the Internet and are not able to remedy an unsafe or undesired behavior. As such, allowing minors access to the Internet has increasingly become a difficult parenting situation.

The Federal Bureau of Investigation released a statistic that each day, at least one adult intends to meet personally with a minor that they have met on the Internet. These unsafe and potentially dangerous individuals stroll through chat rooms or instant messaging sessions looking for potential victims. They use sophisticated manipulation techniques to pretend to be innocuous in order to expose minors to an inappropriate or offensive language, to engage minors to a prurient or sexual conversation, to solicit personal information, characteristics or pictures from minors, and in the worst case, to arrange a physical meeting with minors. Adding to the large amount of intrusive and inappropriate materials on the Internet (e.g., materials with pornographic, hate, or mature content), such a predatory behavior targeted against minors has become a major barrier for parents who want to protect their children from online dangers while still wishing to realize the many benefits of the Internet.

One additional concern for Internet usage by minors involves cyber-bullying. In general, cyber-bullying represents a class of behaviors where electronic communications are used to abuse, exert power on, or deceive minors. Particularly, cyber-bullies engage in an abusive behavior on the Internet intending to scare minors or to harm minors' interactions on the Internet. Cyber-bullying is increasingly becoming a common threat that minors have to face when using the Internet.

Studies of family Internet usage indicate that parents are extremely concerned with their children's safety when the children are on the Internet. Specifically, parents fear that their children may be communicating with or targeted by unsafe or predatory individuals or that their children may be revealing personal information or characteristics to strangers. As discussed, fear of such an unsafe or undesired behavior is a major barrier for families to get online. Removing or reducing this barrier may translate into increased customer base for Internet service providers.

Some known systems and methods try to prevent certain communications by employing filtering programs to block certain keywords and key phrases (e.g., home address, phone number, credit card numbers, etc.) out of emails, chat sessions, or instant messaging sessions. However, such phrase or keyword blocking capabilities are often crude. Furthermore, these known systems and methods often do not offer an effective solution to detect an electronic communication relating to an unsafe or undesired behavior. The keyword matching techniques employed by these known systems and methods usually cannot effectively identify patterns of a communication indicative of an unsafe or undesired behavior.

Accordingly, a solution that detects an electronic communication relating to an unsafe or undesired behavior is desired to address one or more of these and other disadvantages.

SUMMARY OF THE INVENTION

Embodiments of the present invention effectively provide parents, guardians, or other responsible persons a means to protect their minors from an electronic communication that relates to an unsafe or undesired behavior. In particular, embodiments of the present invention effectively provide a means to identify an electronic communication relating to an unsafe or undesired behavior directed to or engaged by the minors. Parents, guardians, or other responsible persons are alerted for an occurrence of such an electronic communication so that they can supervise their minors. Accordingly, parents, guardians, or other responsible persons can feel more positive about their minors being on the Internet communicating with others or can detect an electronic communication that could possibly result in a dangerous interaction between their minors and unsafe or predatory individuals. In addition, according to an embodiment, the invention may effectively detect whether the minors are involved in an electronic communication that inadvertently or intentionally exhibits an unsafe or undesired behavior on the Internet (e.g., cyber-bullying other minors or sharing personal information such as phone number, address, etc.).

Briefly described, a method employing aspects of the invention detects an electronic communication sent or received by a user and relating to an unsafe behavior. The method includes analyzing one or more features of the electronic communication. The one or more features are indicative of the unsafe behavior. The method also includes categorizing the electronic communication as relating to the unsafe behavior as a function of the analyzed features. The method further includes generating a report if the electronic communication is categorized as relating to the unsafe behavior. The report is indicative of the unsafe behavior. The method also includes sending the report to a responsible person of the user.

In another embodiment of the invention, a system embodying aspects of the invention is adapted to detect an electronic communication sent or received by a user and relating to an undesired behavior. The system includes a computer to receive or send the electronic communication. The system includes computer-executable instructions to analyze one or more features of the electronic communication. The one or more features are indicative of the undesired behavior. The system also includes computer-executable instructions to categorize the electronic communication as either relating to the undesired behavior or relating to an innocuous behavior as a function of the analyzed features. The system further includes computer-executable instructions to generate a report if the electronic communication is categorized as relating to the undesired behavior. The report is indicative of the undesired behavior. The system also includes computer-executable instructions to send the report to a responsible person of the user.

In yet another embodiment of the invention, computer-readable media employing aspects of the invention have computer-executable instructions for performing a method to detect an electronic communication sent or received by a user and relating to an unsafe behavior. The method includes analyzing one or more features of the electronic communication. The one or more features are indicative of the unsafe behavior. The method also includes categorizing the electronic communication as relating to the unsafe behavior as a function of the analyzed features. The method further includes generating a report if the electronic communication is categorized as relating to the unsafe behavior. The report is indicative of the unsafe behavior. The method includes sending the report to a responsible person of the user.

One or more computer-readable media having computer-executable instructions for detecting an electronic communication relating to an unsafe behavior embody further aspects of the invention.

Alternatively, one embodiment of the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
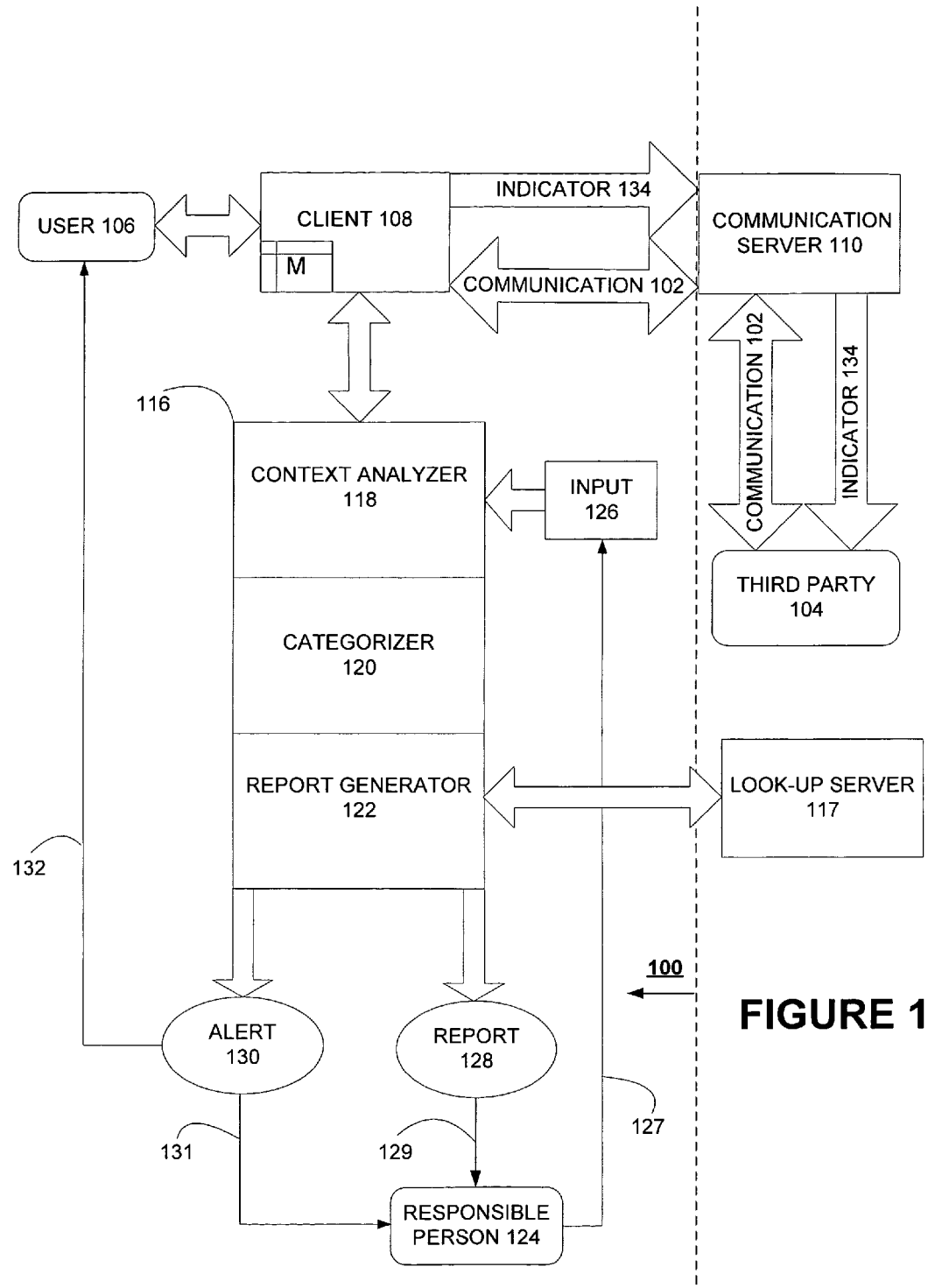
FIG. 1 is a block diagram of an exemplary embodiment of a client-based system according to one embodiment of the invention adapted to detect an electronic communication relating to an unsafe or undesired behavior.
Figure 2:
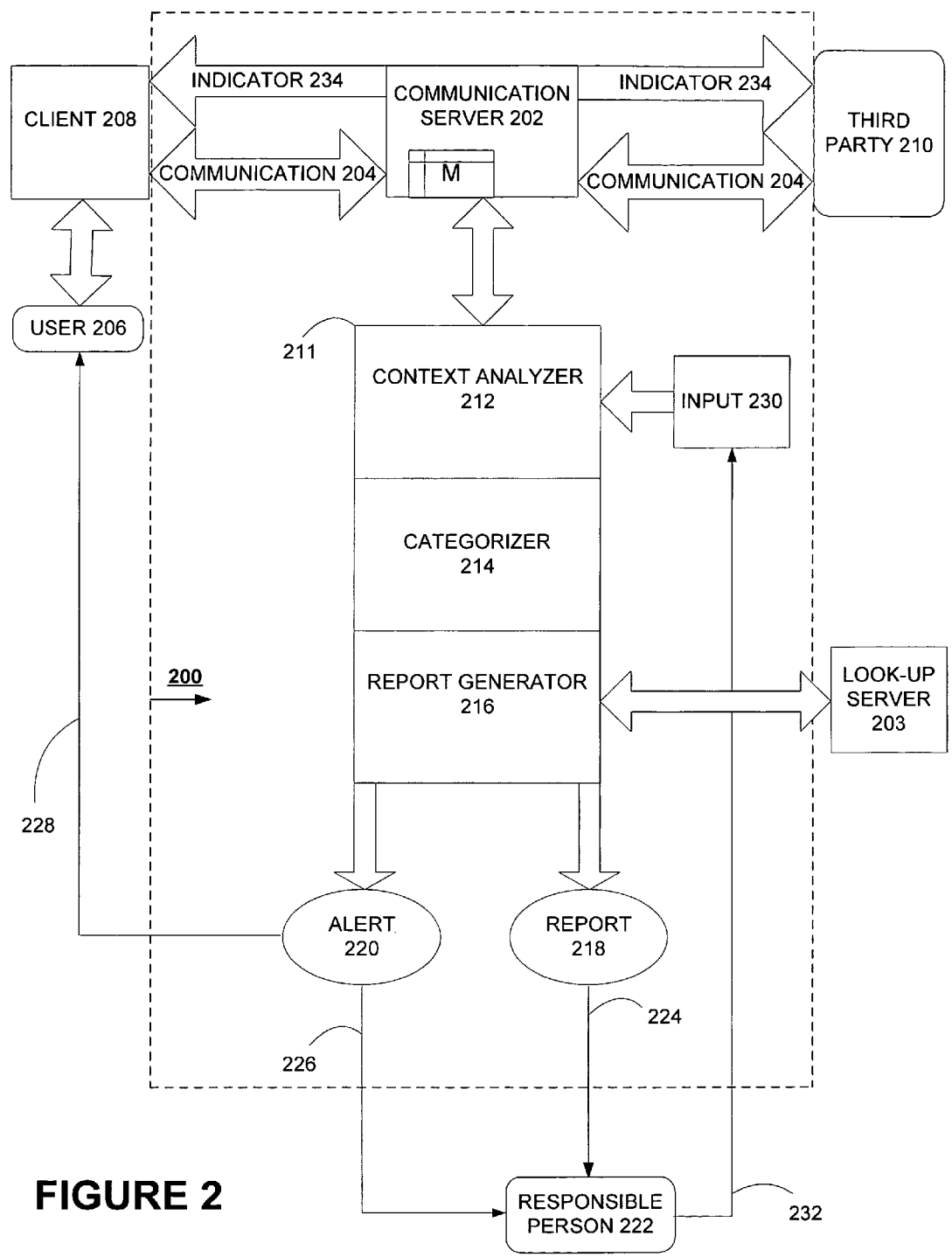
FIG. 2 is a block diagram of an exemplary embodiment of a server-based system according to one embodiment of the invention adapted to detect an electronic communication relating to an electronic communication.

FIG. 1 illustrates an exemplary embodiment of a client-based system 100 according to one embodiment of the invention. The exemplary embodiment of the system 100 is adapted to detect an electronic communication relating to an unsafe or undesired behavior. System 100 handles an electronic communication 102 such as an email, an instant messaging session, or a chat session communicated between a third party 104 and a user 106 (e.g., a minor) via a communication server 110 and over a data communications network. The user 106 may use a client 108 to send or receive the electronic communication 102. The third party 104 may be either a recipient or a source of electronic communication 102. In this embodiment of the invention, system 100 is illustrated as implemented on client 108 and detects whether electronic communication 102 relates to a type of unsafe or undesired behavior. Types of unsafe, undesired, or negative behavior can include sexual predatory behavior, bullying behavior, offensive language, personal information solicitation or revelation, personal characteristics solicitation or revelation, meeting arrangement with a stranger, picture sharing with a stranger, a combination thereof, and so on. In general, user 106 may be a target of electronic communication 102, which may relate to a type of unsafe or undesired behavior. Alternatively, user 106 may employ electronic communication 102 to engage in a type of unsafe or undesired behavior. As indicated herein and as is known by those skilled in the art, system 100 may also be implemented on a communication server (as shown in FIG. 2) or in any other configuration that allows it to detect whether electronic communication 102 relates to a type of unsafe or undesired behavior.

As part of the software instructions operating client 108, included are instructions for receiving or sending electronic communication 102. Depending on the type of electronic communication 102, such instructions may be an email application, an instant messaging application, a chat application, or any other application for receiving or sending electronic communication 102. The software instructions operating client 108 further include storing electronic communication 102 in a memory M of client 108. For example, the memory M may be a XML history file of an instant messaging application. In another example, memory M may be an inbound or outbound mailbox of an email application. Furthermore, memory M may be a random access memory (RAM) or memory disk located within or separate from client 108.

Also shown in FIG. 1 is a detector 116 executed on client 108 and adapted to detect whether electronic communication 102 relates to a type of unsafe or undesired behavior. In an alternative embodiment of the invention, the detector 116 may be executed on a look-up server 117 coupled to the data communications network. In this alternative embodiment, client 108 may include instructions to retrieve electronic communication 102 from memory M and send electronic communication 102 to the look-up server 117 via the data communications network. The look-up server 117 may then execute detector 116 to determine whether electronic communication 102 relates to a type of unsafe or undesired behavior.

According to one exemplary embodiment of the invention, detector 116 may include a context analyzer 118, a categorizer 120, and a report generator 122, which may be different software components or modules of detector 116 and may communicate with each other via application programming interfaces (APIs). Generally, context analyzer 118 may include instructions to control an operation of detector 116. In particular, context analyzer 118 may include instructions to determine whether electronic communication 102 should be analyzed. In one embodiment of the invention, a responsible person 124 (e.g., a parent, guardian, trusted authority, or other responsible person or entity) of user 106 may send an input 126 to context analyzer 118, as indicated by an arrow 127. The input 126 may indicate to context analyzer 118 that third party 104 is trustworthy and safe (e.g., the third party 104 may be a friend, teacher, relative, or family member of user 106). In this case, context analyzer 118 may include instructions to inform detector 116 to withhold from analyzing electronic communication 102 either temporarily or permanently. Alternatively, responsible person 124 may send input 126 to context analyzer 118 indicating that third party 104 is no longer trustworthy so that detector 116 may start analyzing electronic communication 102. This embodiment of the invention advantageously provides responsible person 124 a feedback mechanism to identify trusted third parties. Systems attempting to detect an electronic communication relating to an unsafe or undesired behavior may not always achieve perfect accuracy. Furthermore, true instances of electronic communications relating to an unsafe or undesired behavior may be rare. As a result, many electronic communications detected as relating to an unsafe or undesired behavior may be false alarms. The feedback mechanism of the present invention effectively filters out electronic communications with reduced possibility of relating to an unsafe or undesired behavior before they are analyzed.

The context analyzer 118 may also include instructions to specify a type of unsafe or undesired behavior so that detector 116 may detect whether electronic communication 102 relates to the specified type of unsafe or undesired behavior. For example, responsible person 124 may send input 126 to context analyzer 118 indicating that he or she wishes to detect whether electronic communication 102 relates to sexual predatory behavior. In this example, context analyzer 118 may direct detector 116 to detect whether electronic communication relates to a sexual predatory behavior.

The categorizer 120 includes instructions to categorize electronic communication 102. In general, categorizer 120 may include an unsafe or undesired behavior category model, which may identify combinations of features that are statistically significant in a communication relating to a type of unsafe or undesired behavior. One embodiment of the invention advantageously utilizes pattern recognition to create one or more unsafe or undesired behavior category models. For example, a particular unsafe or undesired behavior category model may be created to identify combinations of statistically significant features of a communication exhibiting or demonstrating sexual predatory behavior, bullying behavior, offensive language, personal information solicitation or revelation, personal characteristics solicitation or revelation, meeting arrangement with a stranger, picture sharing with a stranger, a combination thereof, and so on.

Pattern recognition may create a particular unsafe or undesired behavior category model by using text classification or other techniques to recognize combinations of statistically significant features (e.g., statistically significant keywords, key phrases, and/or contextual information). Communications relating to a type of unsafe or undesired behavior often include some features that are commonly shared among such communications. Examples of such commonly shared and thus statistically significant features might include "what is your address," "don't tell your parents," "let's meet next week," etc. Pattern recognition may train a particular unsafe or undesired behavior category model by using transcripts of actual communications that relate to a type of unsafe or undesired behavior. Such transcripts may be obtained through the Freedom of Information Act or from other public records (e.g., transcripts of predatory conversations collected by investigators and used to prosecute offenders) so that the unsafe or undesired behavior category model may learn and identify combinations of features that are statistically significant in such actual communications relating to a type of unsafe or undesired behavior.

An unsafe or undesired behavior category model trained by pattern recognition may be able to identify combinations of statistically significant features that may not be identified by simple keyword matching techniques. In particular, the statistical techniques used by pattern recognition to create category models may generalize features based on training samples such that the unsafe or undesired category model may be able to recognize variations of a given feature. For example, the unsafe or undesired behavior category model may be able to recognize a slangy phrase such as "don't tell your parents" as relating to an unsafe or undesired behavior. In contrast, the simple keyword matching techniques employed by known systems and methods may not be able to effectively identify such slang or other phrase variations. Nonetheless, it is contemplated by the present invention that keyword matching may be utilized contemporaneously with pattern recognition to identify more accurately an electronic communication relating to an unsafe or undesired behavior.

Based on its analysis of features of electronic communication 102, categorizer 120 may generate a rating, and based on the rating, categorize electronic communication 102 as either relating to a safe or innocuous behavior or relating to a type of unsafe or undesired behavior. The rating of electronic communication 102 is indicative of a probability that electronic communication 102 relates to a type of unsafe or undesired behavior. In one embodiment, the rating of electronic communication 102 is generated based in part on a frequency of a feature appearing in electronic communication 102 as well as a combination of features existing in electronic communication 102. Specifically, a feature that by itself may not be indicative of an unsafe or undesired behavior may serve as contextual or aggregating information indicating that electronic communication 102 relates to an unsafe or undesired behavior. For example, the feature "let's meet next week" alone may not suggest that electronic communication 102 does or does not relate to a type of unsafe or undesired behavior. However, "let's meet next week" in combination with "don't tell your parents" may suggest that electronic communication 102 relates to a physical meeting arrangement with a stranger.

In another embodiment of the invention, a distribution of words within an electronic communication may also indicate an unsafe or undesired behavior. For example, appearances of the words "tell" and "parents" in an electronic communication, even though not within a sentence, may nonetheless indicate that the electronic communication is relating to an unsafe or undesired behavior. Accordingly, the present invention advantageously utilizes a number of factors to determine a probability (i.e., a rating) that an electronic communication relates to a type of unsafe or undesired behavior. This is distinguished from the prior art in which a word or phrase is identified or filtered out of an electronic communication without considering contextual or aggregating information of the electronic communication to decide whether the word or phrase truly indicates or suggests that the electronic communication relates to an unsafe or undesired behavior. An exemplary operation of categorizer 120 in accordance with one embodiment of the invention is discussed hereinafter in connection with FIGS. 3 and 4.

The report generator 122 includes instructions to generate a report 128 if categorizer 120 categorizes electronic communication 102 as relating to a type of unsafe or undesired behavior. The report 128 is indicative of a possible unsafe or undesired behavior related to electronic communication 102. Report generator 122 also includes instructions to send report 128 to responsible person 124 (e.g., via email or other means), as indicated by an arrow 129. If responsible person 124 is also a user of client 108, report generator 122 may send report 128 to an account of responsible person 124 in a client application (e.g., an email, chat, or instant messaging application) executed on client 108. In another embodiment of the invention, report generator 122 may also include instructions to send report 128 to user 106.

Typically, report 128 may include a content of electronic communication 102 (e.g., a transcript, copy, summary, set of extracted sentences, or highlighted version of electronic communication 102) for responsible person 124 to review the content to determine whether electronic communication 102 truly relates to a type of unsafe or undesired behavior. If responsible person 124 determines that electronic communication 102 truly relates to a type of unsafe or undesired behavior, responsible person 124 may decide how to address or remedy the type of unsafe or undesired behavior related to electronic communication 102. For example, responsible person 124 may advise user 106 to avoid interacting with strangers or sharing personal information online. Responsible person 124 may also remove third party 104 from the online or offline contact list of user 106 or inform law enforcement agency that a possible unsafe or undesired behavior may have occurred. By sending report 128 to responsible person 124, the invention advantageously allows responsible person 124 flexibility in deciding how to address or remedy a type of unsafe or undesired behavior possibly related to electronic communication 102.

Report 128 may also include an identification (i.e., an Internet Protocol (IP) address or other identifying information) of a source or recipient of electronic communication 102. For example, report 128 may include an alias, user name, email address, or screen name of third party 104. Including an identification of the source or recipient of electronic communication 102 in report 128 advantageously allows responsible person 124 to identify potential unsafe or predatory individuals so that responsible person 124 may warn user 106 against interacting with such unsafe or predatory individuals. Including the identification in report 128 may also allow responsible person 124 to identify trusted sources or recipients to filter out electronic communications from or to these trusted sources or recipients without analyzing them. Report 128 may also include a type of unsafe or undesired behavior (e.g., sexual predatory behavior, personal information solicitation or revelation, offensive language, etc.) that is possibly related to electronic communication 102 as well as a date and time that electronic communication 102 is sent or received by user 106.

Report 128 may also include a general recommendation on how to address or remedy the identified type of unsafe or undesired behavior related to electronic communication 102. For example, if the identified type of unsafe or undesired behavior is personal information sharing, report 128 may generally recommend responsible person 124 to utilize a blocking software (i.e., a software that blocks personal information from electronic communication 102) or to advise user 106 not to share personal information online. Responsible person 124 may also specify what kind of and how much information should report generator 122 include in report 128. For example, responsible person 124 may specify (e.g., via input 126) that report 128 should include a content of electronic communication 102 in detail. In another example, responsible person 124 may specify that report 128 should include a summary of a type of unsafe or undesired behavior that is related to electronic communication 102 and a general recommendation for addressing or remedying this type of unsafe or undesired behavior.

According to one embodiment of the invention, responsible person 124 may also specify (e.g., via input 126) how often should report generator 122 send report 128 to responsible person 124. For example, responsible person 124 may specify that report generator 122 should send report 128 to responsible person 124 once a day, once a week, once a month, or only when an electronic communication relating to an unsafe or undesired behavior is detected. In this scenario, reports 128 may indicate all of the electronic communications 102 sent or received during a period of time (e.g., a day, week, or month) that possibly relates to one or more types of unsafe or undesired behavior.

In one further embodiment of the invention, if categorizer 120 categorizes electronic communication 102 as relating to a type of unsafe or undesired behavior, report generator 122 may also generate an emergency notification to responsible person 124 and/or user 106. Such an emergency notification is represented in FIG. 1 as an alert 130, which is sent to responsible person 124 as indicated by an arrow 131, or to user 106 as indicated by an arrow 132. The alert 130 may notify responsible person 124 of any electronic communication 102 relating to a type of unsafe or undesired behavior targeted against or engaged by user 106 which may need urgent attention. For example if third party 104 is a sexual predator who via electronic communication 102 has arranged a physical meeting with user 106, then alert 130 may notify (e.g., via pager or text/voice messenger) responsible person 124 of such a situation so that responsible person 124 may promptly address or remedy the threat (e.g., by informing law enforcement agency). The alert 130 may also include an identification (e.g., an IP address or other identifying information) of third party 104 to locate third party 104. In another embodiment of the invention, alert 130 may also inform user 106 that third party 104 is unsafe and potentially dangerous. For example, if third party 104 is soliciting personal information from user 106, alert 130 may be a message displaying on a screen of client 108 alerting user 106 that third party 104 is soliciting personal information and that user 106 should not reveal personal information online. Report generator 122 may also send alert 130 to the specific client application that user 106 uses to send or receive electronic communication 102. For example, alert 130 may be an email message sent to an email application, an instant messaging message sent to an instant messaging application, or a chat statement sent to a chat application.

FIG. 1 also shows an indicator 134 sent from client 108 to communication server 110 and then to third party 104. The indicator 134 is operative to warn third party 104 that electronic communication 102 is being analyzed. In one embodiment of the invention, indicator 134 may be a text attachment to electronic communication 102 sent to third party 104. If third party 104 accesses the same web service as user 106, indicator 134 may also be a logo displaying on a screen of a client used by third party 104. This logo, which warns that any communication with user 106 is being analyzed, may also be located on a client application (e.g., an email, chat, or instant messaging application) executed on the client used by third party 104. By utilizing indicator 134 to warn third party 104 that electronic communication 102 is being analyzed, the embodiment of the invention may possibly scare away potential unsafe or predatory individuals (e.g., sexual predators, cyber-bullies, etc.) before they target user 106 as their victim. Indicator 134 sent to third party 104 also has the function of informing third party 104 that he or she should not expect any privacy rights in electronic communication 102.

In another exemplary embodiment, indicator 134 may also be sent to user 106 or displayed on the screen of client 108. In this case, indicator 134 may be utilized to inform user 106 not to expect privacy rights in electronic communication 102 as well as caution user 106 not to employ electronic communication 102 to engage in an unsafe or undesired behavior. The indicator 134 may also be displayed to user 106 as a logo located on a client application used to send or receive electronic communication 102.

It should be noted that different implementations of system 100 are also contemplated by this invention. For example, although memory M is shown in FIG. 1 as within client 108 for convenience, it is to be understood that in other embodiments of the invention, memory M may be one or more memories included within or separate from client 108. Furthermore, even though context analyzer 118, categorizer 120, and report generator 122 are shown as different software modules or components of detector 116, it is to be understood that they may all be part of the same software component or module or that each may be a separate software program.

One embodiment of the invention may also be implemented by a server-based system 200 as illustrated in FIG. 2. The system 200 includes a communication server 202 having communication capability for receiving an electronic communication 204 communicated between a user 206 using a client 208 and a third party 210. The communication server 202 has a memory M to store the electronic communication 204. System 200 further includes instructions to send electronic communication 204 to a detector 211. The detector 211 may be executed on communication server 202 or executed on a look-up server 203. Detector 211 includes a context analyzer 212 for controlling an operation of detector 211; a categorizer 214 for categorizing electronic communication 204 as either relating to a safe or innocuous behavior or relating to a type of unsafe or undesired behavior; and a report generator 216 for generating a report 218 or an alert 220. The report generator 216 may send the report 218 to a responsible person 222, as indicated by an arrow 224. Report generator 216 may also send report 218 to user 206. The alert 220 may be sent to the responsible person 222 as indicated by an arrow 226, and/or to user 206 as indicated by an arrow 228. Both report 218 and alert 220 are indicative of an unsafe or undesired behavior possibly related to electronic communication 204. Responsible person 222 may send an input 230 to the context analyzer 212, as indicated by an arrow 232. The input 230 may indicate whether or not third party 210 is trustworthy; a type of unsafe or undesired behavior such that detector 211 may detect whether electronic communication 204 relates to the specified type of unsafe or undesired behavior; how often should report generator 216 send report 218; what kind of information and how much information should report 218 include; etc. System 200 also includes an indicator 234 sent to third party 210 and/or user 206. The indicator 234 may also be displayed (e.g., as a logo) on client 208 used by user 206 and/or on another client used by third party 210. Indicator 234 informs third party 210 and/or user 206 that electronic communication 204 is being analyzed.

Figure 3:
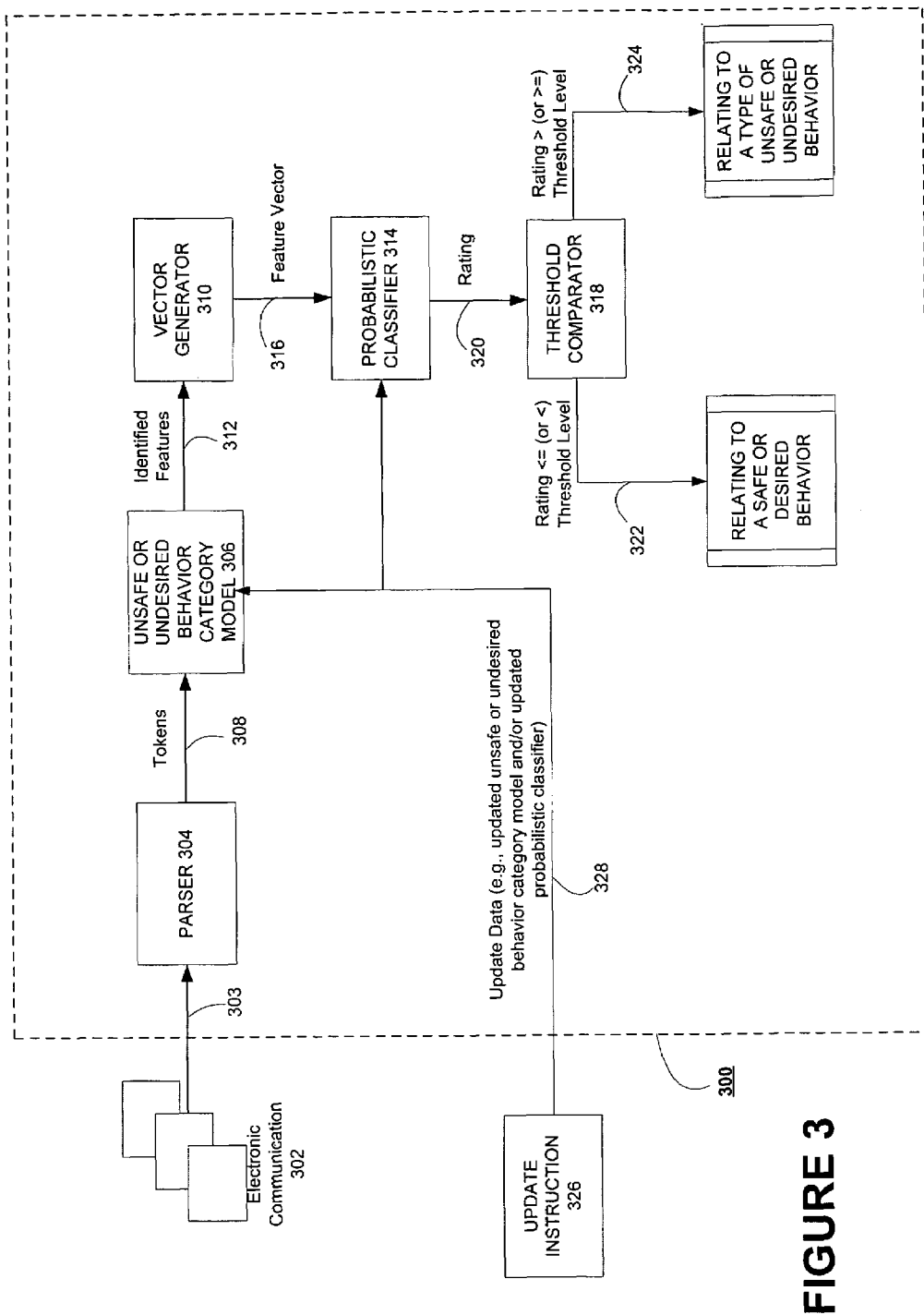
FIG. 3 is a block diagram of an exemplary embodiment of a categorizer according to one embodiment of the invention adapted to categorize an electronic communication.

Referring now to FIG. 3, an exemplary embodiment of a categorizer 300 adapted to categorize an electronic communication according to one embodiment of the invention is shown. FIG. 3 shows categorizer 300 having instructions to receive an electronic communication 302, as indicated by an arrow 303. In one exemplary embodiment of the invention, categorizer 300 may include a parser 304. The parser 304 includes instructions to parse the electronic communication 302. For example, parser 304 may break up a content of electronic communication 302 into a group or sequence of constituent tokens. Each token may represent a word, phrase, or any other semantic or syntactic representation of a language. According to one embodiment of the invention, parser 304 may parse the entire content of electronic communication 302 (e.g., all of the messages sent or received). Alternatively, parser 304 may parse electronic communication 302 with respect to a certain period of time (e.g., messages received or sent within the past hour) or with respect to a certain size window (e.g., the last 10 messages sent or received, the last 100 kilobytes of data sent or received, etc.). For example, if electronic communication 302 is a chat session, then parser 304 may parse the entire content of the chat session or a particular chat statement sent or received within a period of time or size window. Similarly, if electronic communication 302 is an instant messaging session, then parser 304 may parse the entire content of the instant messaging session or a particular instant messaging message sent or received within a period of time or size window. If electronic communication 302 represents one or more email messages, then parser 304 may parse a single email message, an entire thread of email messages, or email messages sent or received within a period of time or size window.

FIG. 3 shows that the tokens generated by parser 304 are sent to an unsafe or undesired behavior category model 306, as indicated by an arrow 308. In general, the unsafe or undesired behavior category model 306 may identify combinations of features that are statistically significant in a communication relating to a particular type of unsafe or undesired behavior. For example, one or more unsafe or undesired behavior category models 306 may identify features associated with one or more of the following types of unsafe or undesired behavior: sexual predatory behavior, bullying behavior, offensive language, personal information solicitation or revelation, personal characteristics solicitation or revelation, meeting arrangement with a stranger, picture sharing with a stranger, a combination thereof, and so on. In one exemplary embodiment of the invention, unsafe or undesired behavior category model 306 may be a text file identifying a list of features that are associated with a particular type of unsafe or undesired behavior. For example, unsafe or undesired behavior category model 306 may be a text file with the following features: "let's meet," "don't tell your parents," "what do you look like," etc. The described features may be associated with one or more types of unsafe or undesired behavior such as sexual predatory behavior, solicitation of personal characteristics, or meeting arrangement with a stranger. Each feature in unsafe or undesired behavior category model 306 may also be assigned a weight. The weight of a feature indicates how much consideration is given to the feature when deciding whether electronic communication 302 relates to a particular type of unsafe or undesired behavior. In other words, if a given feature frequently appears in a communication relating to the particular type of unsafe or undesired behavior, then the feature is assigned a greater weight.

A wide variety of training techniques may be utilized to create unsafe or undesired behavior category model 306. As one particular example, pattern recognition may be utilized to create unsafe or undesired behavior category model 306. In the pattern recognition training process, a number of transcripts or documents is collected (e.g., through the Freedom of Information Act or from other public records). These transcripts or documents may generally be divided into three classifications: content (i.e., transcripts or documents relating to a type of unsafe or undesired behavior), anti-content (i.e., transcripts or documents not relating to the type of unsafe or undesired behavior), and close anti-content (i.e., transcripts or documents not relating to the type of unsafe or undesired behavior but including some features that may appear in content (e.g., a meeting arrangement between two classmates to study)). These transcripts or documents (i.e., training samples) may be fed into computer-executable training instructions. The computer-executable training instructions may identify features that are present in content but not in anti-content or close anti-content. The identified features may then be classified as features that are statistically significant in a communication relating to the particular type of unsafe or undesired behavior. The computer-executable training instructions may also assign a weight to each feature classified as statistically significant. For example, the computer-executable training instructions may assign greater weights to features present in content but not close anti-content and smaller weights to features present in both content and close anti-content. The weight assigned to a given feature may also be based on how frequently the feature appears in content or close anti-content. It is noted that the computer-executable training instructions may be implemented as a number of different architectures. For example, the computer-executable instructions may be implemented as a Naïve Bayesian classifier, a limited dependence Bayesian classifier, a Bayesian network classifier, a decision tree, a support vector machine, a content matching classifier, a combination thereof, and so on.

In one embodiment of the invention, unsafe or undesired behavior category model 306 may examine each token of electronic communication 302 to examine whether the token matches a feature of unsafe or undesired behavior category model 306 (i.e., a feature that is statistically significant in a communication relating to a type of unsafe or undesired behavior). If a token of electronic communication 302 matches a feature of unsafe or undesired behavior category model 306, then unsafe or undesired behavior category model 306 identifies the feature as included in electronic communication 302. One or more features of unsafe or undesired behavior category model 306 identified as included in electronic communication 302 are sent to a vector generator 310 of categorizer 300, as indicated by an arrow 312. Unsafe or undesired behavior category model 306 may also indicate to the vector generator 310 a frequency that a feature of unsafe or undesired behavior category model 306 appears in electronic communication 302 (i.e., the number of tokens of electronic communication 302 that matches the feature of unsafe or undesired behavior category model 306). The vector generator 310 includes instructions to generate a feature vector, which is indicative of each feature of unsafe or undesired behavior category model 306 that is present in electronic communication 302 (e.g., as determined by a match between a token of electronic communication 302 and a feature of unsafe or undesired behavior category model 306). The feature vector may also indicate a frequency that a feature of unsafe or undesired behavior category model 306 appears in electronic communication 302. The feature vector generated by vector generator 310 may be applied to a probabilistic classifier 314 of categorizer 300, as indicated by an arrow 316.

According to one embodiment of the invention, the probabilistic classifier 314 may be implemented as a Naïve Bayesian classifier, a limited dependence Bayesian classifier, a Bayesian network classifier, a decision tree, a support vector machine, a content matching classifier, a combination thereof, and so on. Generally, probabilistic classifier 314 is operative to receive the feature vector generated by vector generator 310. Based on the features included in the feature vector and their associated weights (as well as a frequency that a given feature of unsafe or undesired behavior category model 306 appears in electronic communication 302), probabilistic classifier 314 may generate a rating indicating a probability that electronic communication 302 relates to a particular type of unsafe or undesired behavior. The rating of electronic communication 302 may be in the form of a percentage. For example, the rating of electronic communication 302 may indicate that there is a 60% chance that electronic communication 302 relates to a particular type of unsafe or undesired behavior. Thus, according to one exemplary embodiment of the invention, the higher the rating of electronic communication 302, the higher the probability that electronic communication 302 relates to a type of unsafe or undesired behavior.

In one embodiment of the invention, the rating of electronic communication 302 may be applied to a threshold comparator 318, as indicated by an arrow 320. The threshold comparator 318 has stored thereon a threshold level. Threshold comparator 318 includes instructions to compare the rating of electronic communication 302 to the threshold level. If the rating of electronic communication 302 is less than or equal to (or less than) the threshold level, then electronic communication 302 is categorized as relating to a safe or innocuous behavior, as indicated by an arrow 322. If the rating of electronic communication 302 is greater than (or greater than or equal to) the threshold level, then electronic communication 302 is categorized as relating to a type of unsafe or undesired behavior, as indicated by an arrow 324. It is noted that a responsible person (e.g., responsible person 124) may change the sensitivity of categorizer 300 by changing the threshold level. For example, the threshold level can be set higher so that fewer electronic communications may be categorized as relating to a type of unsafe or undesired behavior (i.e., a less chance that electronic communication 302 is categorized as relating to a type of unsafe or undesired behavior).

FIG. 3 further shows an exemplary update instruction 326 that includes instructions to provide update data to categorizer 300, as indicated by arrows 328. Particularly, the update instruction 326 may update categorizer 300 with an updated unsafe or undesired behavior category model 306 and/or an updated probabilistic classifier 314. Updating categorizer 300 might be necessary because the features that are statistically significant in a communication relating to a type of unsafe or undesired behavior may change over time. In today's rapidly changing Internet community, users constantly find new ways or new languages to communicate with each other. This is especially true for teenagers, who usually have a special way to communicate. For example, when communicating with others online, teenagers often use abbreviations or other forms to represent a word or phrase (e.g., using "u" to represent "you" or "dat" to represent "that"). If categorizer 300 does not have updated information on the way that people communicate online, categorizer 300 might not be able to accurately categorize electronic communication 302. By periodically (e.g., once in six months) updating categorizer 300 with an updated unsafe or undesired behavior category model 306 and/or an updated probabilistic classifier 314, categorizer 300 may be able to remain accurate in categorizing an electronic communication.

To enhance the accuracy of categorizer 300 in categorizing electronic communication 302, categorizer 300 may also include spell checking and/or phonetic spell checking capabilities (not shown). For example, before electronic communication 302 is applied to parser 304, categorizer 300 may include instructions to spell check and/or phonetic spell check electronic communication 302 to detect and correct any misspellings and/or phonetic misspellings. Similarly, categorizer 300 may include instructions to spell check and/or phonetic spell check the tokens generated by parser 304. By spell checking and/or phonetic spell checking electronic communication 302 or its constituent tokens, categorizer 300 may enhance the chance that it may correctly categorize electronic communication 302 even if electronic communication 302 includes misspellings and/or phonetic misspellings.

Figure 4:
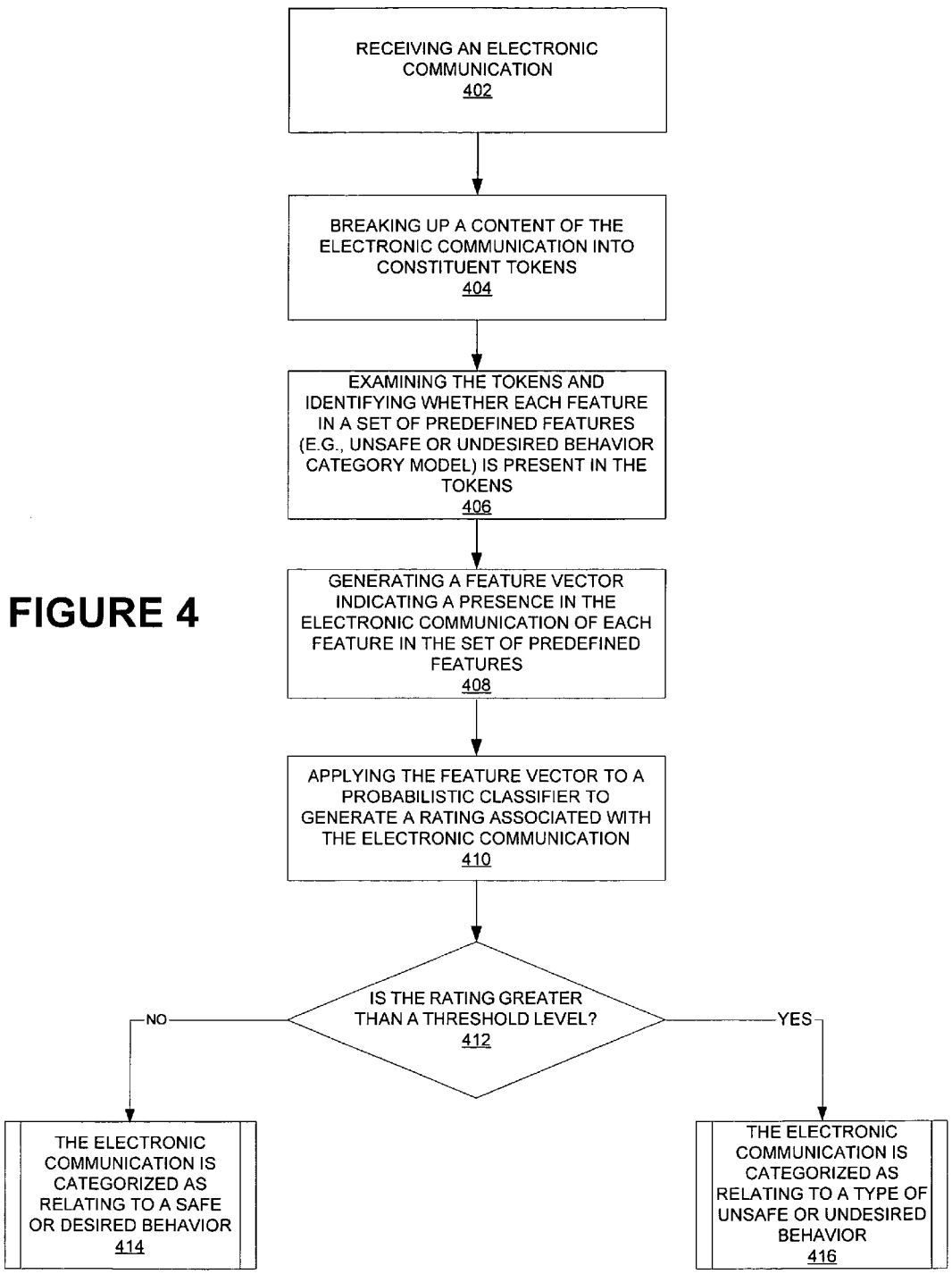
FIG. 4 is an exemplary diagram illustrating a process according to one embodiment of the invention for categorizing an electronic communication.

FIG. 4 generally shows an exemplary flow diagram illustrating process flow for categorizing an electronic communication according to one embodiment of the invention. At 402, a categorizer such as categorizer 300 of FIG. 3 receives an electronic communication. At 404, a content of the electronic communication is broken up into constituent tokens. For example, parser 304 may be utilized to parse the electronic communication into its constituent tokens. Proceeding to 406, the constituent tokens of the electronic communication are examined to identify whether each feature in a set of predefined features is present in the tokens. An unsafe or undesired behavior category model such as unsafe or undesired behavior category model 306 of FIG. 3 may define the set of predefined features. The set of predefined features identifies features that are statistically significant in a communication relating to a type of unsafe or undesired behavior. Each feature in the set of predefined features may also be associated with a weight indicating how significant the feature is in deciding whether the electronic communication relates to the type of unsafe or undesired behavior. In response to the examination of the tokens at 406, one embodiment of the invention generates a feature vector associated with the electronic communication, as indicated at 408. According to the embodiment of the invention, a vector generator such as vector generator 310 of FIG. 3 may be utilized to generate the feature vector. The feature vector may indicate a presence in the electronic communication of each feature of the set of predefined features. In other words, the feature vector may include the features of the predefined set of features that are included in the electronic communication as well as the weights of the included features. Proceeding to 410, one embodiment of the invention applies the feature vector to a probabilistic classifier such as probabilistic classifier 314 of FIG. 3. The probabilistic classifier examines the feature vector to determine a rating associated with the electronic communication. The rating of the electronic communication may be in the form of a percentage and generally, the higher the rating, the higher the probability that the electronic communication relates to a particular type of unsafe or undesired behavior. At 412, the rating of the electronic communication is compared with a threshold level. In one embodiment of the invention, a threshold comparator such as threshold comparator 318 of FIG. 3 may perform such comparison. If the rating associated with the electronic communication is less than or equal to (or less than) the threshold level, then the electronic communication is categorized as relating to a safe or innocuous behavior, as indicated at 414. If the rating associated with the electronic communication is greater than (or greater than or equal to) the threshold level, then the electronic communication is categorized as relating to a type of unsafe or undesired behavior, as indicated at 416.

Figure 5:
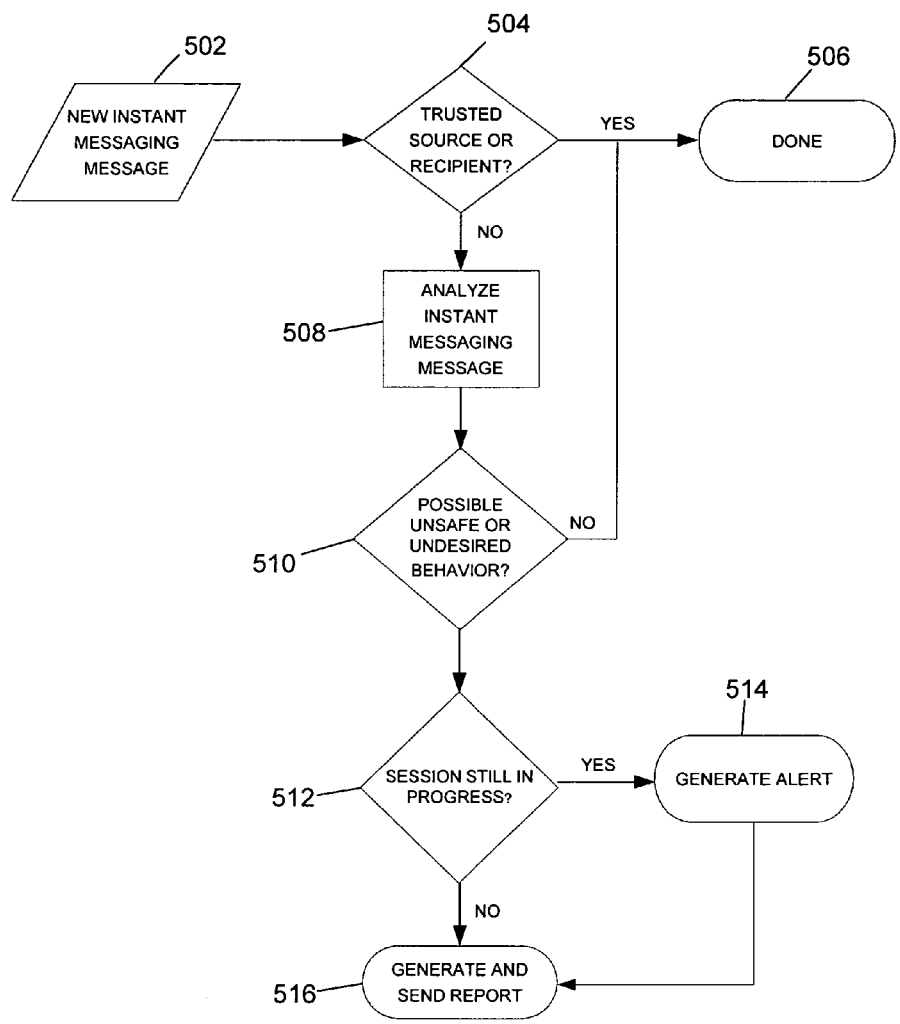
FIG. 5 is an exemplary diagram illustrating a process according to one embodiment of the invention for detecting an electronic communication relating to an unsafe or undesired behavior.

FIG. 5 illustrates an exemplary system 500 such as a client-based or server-based system for handling an electronic communication. Instructions 502 receive an electronic communication such as an instant messaging message (or any other types of electronic communication). At 504, system 500 determines if a source or recipient of the instant messaging message is trustworthy. If the source or recipient of the instant messaging message is determined to be trustworthy, system 500 completes the process at 506 without analyzing the instant messaging message. If the source or recipient of the instant messaging message is determined not to be trustworthy, system 500 analyzes the instant messaging message at 508. At 510, if system 500 does not detect a possible unsafe or undesired behavior related to the instant messaging message, system 500 completes the process at 506. If system 500 detects a possible unsafe or undesired behavior related to the instant messaging message, system 500 determines at 512 whether the instant messaging session is still in progress. If the instant messaging session is still in progress, system 500 may generate an alert at 514 to inform a user and/or a responsible person of the user that the instant messaging message possibly relates to an unsafe or undesired behavior. Such an alert advantageously allows the user and/or the responsible person to take prompt actions to address or remedy the possible unsafe or undesired behavior related to the instant messaging message. After, before, or contemporaneously with the generation of the alert, system 500 may also generate and send a report to the responsible person and/or the user setting forth information about the possible unsafe or undesired behavior that is related to the instant messaging message, as indicated at 516. Back to 512, if the instant messaging session is not in progress, system 500 may generate and send the report to the responsible person and/or the user, as indicated at 516, without generating the alert.

Figure 6:
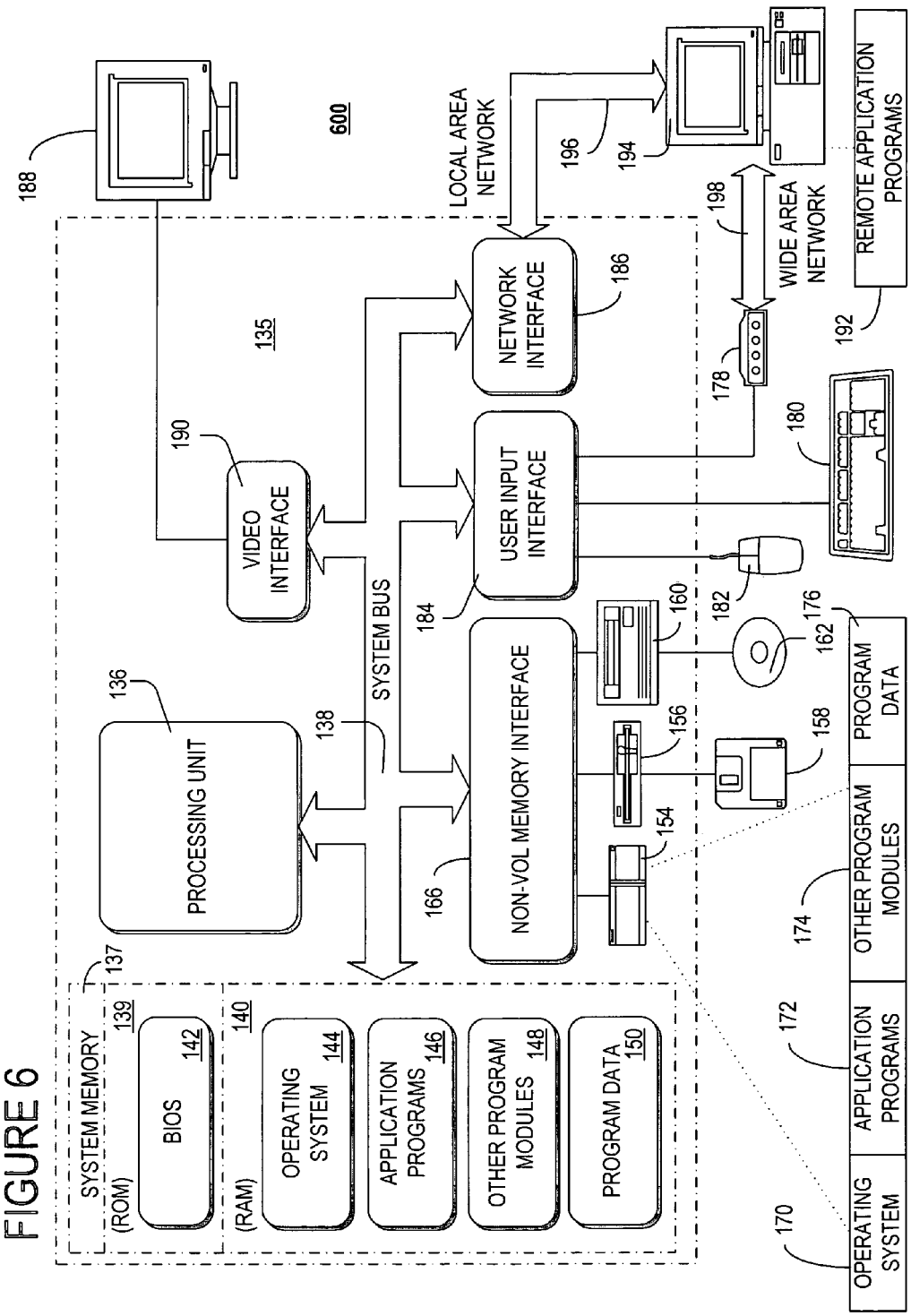
FIG. 6 is a block diagram illustrating one example of a suitable computing system environment in which one embodiment of the invention may be implemented.

FIG. 6 shows one example of a general purpose computing device in the form of a computer 135. In one embodiment of the invention, a computer such as the computer 135 is suitable for use in client 108, client 208, communication server 110, communication server 202, or any other figures illustrated and described herein. Computer 135 has one or more processors or processing units 136 and a system memory 137. In the illustrated embodiment, a system bus 138 couples various system components including the system memory 137 to the processors 136. The bus 138 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 135 typically has at least some form of computer readable media. Computer readable media, which include both volatile and nonvolatile media, removable and non-removable media, may be any available medium that can be accessed by computer 135. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 135. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristic set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 137 includes computer storage media in the form of removable and/or non-removable, volatile and/or nonvolatile memory. In the illustrated embodiment, system memory 137 includes read only memory (ROM) 139 and random access memory (RAM) 140. A basic input/output system 142 (BIOS), containing the basic routines that help to transfer information between elements within computer 135, such as during start-up, is typically stored in ROM 139. RAM 140 typically contains data and/or program modules that are immediately accessible to and/or presently being operated on by processing unit 136. By way of example, and not limitation, FIG. 6 illustrates operating system 144, application programs 146, other program modules 148, and program data 150.

The computer 135 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 138 by a non-volatile memory interface, such as interface 166.

The drives or other mass storage devices and their associated computer storage media discussed above and illustrated in FIG. 6, provide storage of computer readable instructions, data structures, program modules and other data for the computer 135. In FIG. 6, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 135 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 136 through a user input interface 184 that is coupled to system bus 138, but may be connected by other interface and bus structures, such as a parallel port, game port, or a Universal Serial Bus (USB). A monitor 188 or other type of display device is also connected to system bus 138 via an interface, such as a video interface 190. In addition to the monitor 188, computers often include other peripheral output devices (not shown) such as a printer and speakers, which may be connected through an output peripheral interface (not shown).

The computer 135 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 135. The logical connections depicted in FIG. 6 include a local area network (LAN) 196 and a wide area network (WAN) 198, but may also include other networks. LAN 138 and/or WAN 139 can be a wired network, a wireless network, a combination thereof, and so on. Such networking environments are commonplace in offices, enterprise-wide computer networks, intranets, and global computer networks (e.g., the Internet).

When used in a local area networking environment, computer 135 is connected to the LAN 196 through a network interface or adapter 186. When used in a wide area networking environment, computer 135 typically includes a modem 178 or other means for establishing communications over the WAN 198, such as the Internet. The modem 178, which may be internal or external, is connected to system bus 138 via the user input interface 184, or other appropriate mechanism. In a networked environment, program modules depicted relative to computer 135, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 135 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 135, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a data communication network. In a distributed computing environment, program modules may be located in both local and remote computer storage media including memory storage devices.

In operation, computer 135 executes computer-executable instructions such as those illustrated in FIGS. 1-5 to detect an electronic communication relating to an unsafe behavior targeted to or engaged by a user. Instructions are adapted to analyze one or more features of the electronic communication, which is sent or received by the user. Instructions are adapted to categorize the electronic communication as relating to the unsafe behavior based on the analyzed features. A report is generated if the electronic communication is categorized as relating to the unsafe behavior. Instructions are adapted to send the report to a responsible person of the user. The report informs the responsible person that the electronic communication possibly relates to the unsafe behavior.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method for notifying a responsible person of a minor of an electronic communication sent or received by the minor and including content relating to sexual predatory behavior directed to the minor, comprising:
    specifying a type of the sexual predatory behavior to detect whether the electronic communication relates to said type of the sexual predatory behavior wherein said type of the sexual predatory behavior includes one or more of the following: bullying behavior, offensive language, personal information solicitation or revelation, personal characteristics solicitation or revelation, meeting arrangement with a stranger, picture sharing with a stranger, or a combination thereof;
    parsing the electronic communication to generate a plurality of constituent tokens of the electronic communication;
    generating, in response to said tokens, a feature vector associated with the electronic communication, said feature vector indicating whether each one of a predefined set of one or more features relating to the type of the sexual predatory behavior is present in the electronic communication; and
    applying the generated feature vector to a probabilistic classifier relating to the type of the sexual predatory behavior to generate a rating for the electronic communication, wherein the probabilistic classifier trained on a content, anti-content, and close anti-content of the type of the sexual predatory behavior to identify said predefined set of one or more features, said rating indicating a probability that the electronic communication relates to the type of the sexual predatory behavior;
    categorizing the electronic communication as relating to the type of the sexual predatory behavior as a function of the rating;
    generating a report if the electronic communication is categorized as relating to the sexual predatory behavior, said report indicative of the sexual predatory behavior directed to the minor; and
    sending the report to the responsible person of the minor.

2. The method of claim 1, wherein the electronic communication is categorized as relating to the type of the sexual predatory behavior if the rating is greater than a threshold level.

3. The method of claim 1, wherein the probabilistic classifier comprises one or more classifiers selected from a group comprising: a Naïve Bayesian classifier, a limited dependence Bayesian classifier, a Bayesian network classifier, a decision tree, a support vector machine, a content matching classifier, or a combination thereof.

4. The method of claim 1, wherein parsing the electronic communication comprises one or more of the following: parsing the electronic communication with respect to a certain period of time, parsing the electronic communication with respect to a certain size window, or parsing the entire electronic communication.

5. The method of claim 1 further comprises updating one or more of the following: the probabilistic classifier or the predefined set of one or more features.

6. The method of claim 1, wherein the report is further sent to the minor.

7. The method of claim 1 further comprising not to generate and send the report if an input indicating that a source or recipient of the electronic communication is trustworthy is received from the responsible person.

8. The method of claim 1, wherein the report comprises one or more of the following: a content of the electronic communication, an identification of a source or recipient of the electronic communication, a time of the electronic communication, a type of the sexual predatory behavior related to the electronic communication, and a recommendation of how to address said type of the sexual predatory behavior.

9. The method of claim 1 further comprising indicating that the electronic communication is being analyzed to one or more of the following: a source or recipient of the electronic communication or the minor.

10. The method of claim 1 further comprising generating an alert if the electronic communication is categorized as relating to the sexual predatory behavior, said alert informing that the electronic communication relates to the sexual predatory behavior to one or more of the following: the minor or the responsible person.

11. The method of claim 10, wherein said alert is generated only if the electronic communication is still in progress.

12. The method of claim 1, wherein the electronic communication comprises one or more electronic messages selected from a group comprising: an email, an instant messaging session, or a chat session.

13. One or more computer readable storage media having computer-executable instructions for performing the method of claim 1.

14. A system for detecting an electronic communication sent or received by a minor including sexual predatory behavior, comprising:
 a computer to receive or send the electronic communication;
 computer-executable instructions to specify a type of the sexual predatory behavior to detect whether the electronic communication relates to said type of the sexual predatory behavior wherein said type of the sexual predatory behavior includes one or more of the following: bullying behavior, offensive language, personal information solicitation or revelation, personal characteristics solicitation or revelation, meeting arrangement with a stranger, picture sharing with a stranger, or a combination thereof;
 computer-executable instructions to analyze one or more features of the electronic communication, said one or more features indicative of the sexual predatory behavior wherein the computer-executable instructions to analyze one or more features of the electronic communication further comprise computer-executable instructions to:
  parse the electronic communication to generate a plurality of constituent tokens of the electronic communication;
  generate, in response to said tokens, a feature vector associated with the electronic communication, said feature vector indicating whether each one of a predefined set of one or more features relating to the type of the sexual predatory behavior is present in the electronic communication; and
  apply the generated feature vector to a probabilistic classifier relating to the type of the sexual predatory behavior to generate a rating for the electronic communication, wherein the probabilistic classifier trained on a content, anti-content, and close anti-content of the type of the sexual predatory behavior to identify said predefined set of one or more features, said rating indicating a probability that the electronic communication relates to the type of the sexual predatory behavior;
 computer-executable instructions to categorize the electronic communication as either relating to the sexual predatory behavior or relating to an innocuous behavior as a function of the analyzed features rating;
 computer-executable instructions to generate a report if the electronic communication is categorized as relating to the sexual predatory behavior, said report indicative of the sexual predatory behavior; and
 computer-executable instructions to send the report to a responsible person of the minor.

15. The system of claim 14, wherein the electronic communication is categorized as relating to the type of the sexual predatory behavior if the rating is greater than a threshold level.

16. The system of claim 14, wherein the probabilistic classifier comprises one or more classifiers selected from a group comprising: a Naïve Bayesian classifier, a limited dependence Bayesian classifier, a Bayesian network classifier, a decision tree, a support vector machine, a content matching classifier, or a combination thereof.

17. The system of claim 14, wherein the computer-executable instructions to parse the electronic communication comprise computer-executable instructions to perform one or more of the following: parsing the electronic communication with respect to a certain period of time, parsing the electronic communication with respect to a certain size window, or parsing the entire electronic communication.

18. The system of claim 14 further comprising computer-executable instructions to update one or more of the following: the probabilistic classifier or the predefined set of one or more features.

19. The system of claim 14, wherein the report is further sent to the minor.

20. The system of claim 14 further comprising computer-executable instructions not to generate and send the report if an input indicating that a source or recipient of the electronic communication is trustworthy is received from the responsible person.

21. The system of claim 14, wherein the report comprises one or more of the following: a content of the electronic communication, an identification of a source or recipient of the electronic communication, a time of the electronic communication, a type of the sexual predatory behavior related to the electronic communication, and a recommendation of how to address said type of the sexual predatory behavior.

22. The system of claim 14 further comprising computer-executable instructions to indicate that the electronic communication is being analyzed to one or more of the following: a source or recipient of the electronic communication or the minor.

23. The system of claim 14 further comprising computer-executable instructions to generate an alert if the electronic communication is categorized as relating to the sexual predatory behavior, said alert adapted to inform that the electronic communication relates to the sexual predatory behavior to one or more of the following: the minor or the responsible person.

24. The system of claim 23, wherein said alert is generated only if the electronic communication is still in progress.

25. The system of claim 14, wherein the electronic communication comprises one or more electronic messages selected from a group comprising: an email, an instant messaging session, or a chat session.

26. The system of claim 14, wherein said computer is a server or a client.

27. The system of claim 14, wherein said computer is a client and said computer-executable instructions to analyze the electronic communication are located on a server, and wherein the server is adapted to receive the electronic communication sent or received by the client for said computer-executable instructions located on the server to analyze the electronic communication.

28. A computer-readable storage medium having computer-executable instructions for performing a method to detect an electronic communication sent or received by a minor and relating to a sexual predatory behavior directed to the minor, said method comprising:

specifying a the type of the sexual predatory behavior directed to the minor to detect whether the electronic communication relates to said type of the sexual predatory behavior directed to the minor wherein said type of the sexual predatory behavior includes one or more of the following: bullying behavior, offensive language, personal information solicitation or revelation, personal characteristics solicitation or revelation, meeting arrangement with a stranger, picture sharing with a stranger, or a combination thereof;

parsing the electronic communication to generate a plurality of constituent tokens of the electronic communication;

generating, in response to said tokens, a feature vector associated with the electronic communication, said feature vector indicating whether each one of a predefined set of one or more features relating to the type of the sexual predatory behavior directed to the minor is present in the electronic communication; and applying the generated feature vector to a probabilistic classifier relating to the type of the sexual predatory behavior to generate a rating for the electronic communication, wherein the probabilistic classifier trained on a content, anti-content, and close anti-content of the type of the sexual predatory behavior directed to the minor to identify said predefined set of one or more features, said rating indicating a probability that the electronic communication relates to the type of the sexual predatory behavior directed to the minor;

categorizing the electronic communication as relating to the type of the sexual predatory behavior directed to the minor as a function of the rating;

generating an alert to a responsible person of the minor if an electronic communication session associated with the electronic communication is still in progress, said alert indicative that the sexual predatory behavior directed to the minor is in progress;

generating a report if the electronic communication is categorized as relating to the sexual predatory behavior directed to the minor, said report indicative that the sexual predatory behavior directed to the minor has occurred; and sending the report to the responsible person of the minor.

29. The computer-readable storage medium of claim 28, wherein parsing the electronic communication comprises one or more of the following: parsing the electronic communication with respect to a certain period of time, parsing the electronic communication with respect to a certain size window, or parsing the entire electronic communication.

30. The computer-readable storage medium of claim 28, wherein the method further comprises not to generate and send the report if an input indicating that a source or recipient of the electronic communication is trustworthy is received from the responsible person.

31. The computer-readable storage medium of claim 28, wherein the method further comprises indicating that the electronic communication is being analyzed to one or more of the following: a source or recipient of the electronic communication or the minor.

32. The computer-readable storage medium of claim 28, wherein the alert informs the minor that the electronic communication relates to the sexual predatory behavior directed to the minor.

\* \* \* \* \*